United States Patent
Vyas et al.

(10) Patent No.: US 9,503,987 B2
(45) Date of Patent: Nov. 22, 2016

(54) REDUCING POWER CONSUMPTION IN WIRELESS STATIONS EXECUTING VARIOUS CLIENT APPLICATIONS

(71) Applicant: GainSpan Corporation, San Jose, CA (US)

(72) Inventors: Pankaj Vyas, Banagalore (IN); Vishal Batra, Bangalore (IN)

(73) Assignee: GAINSPAN CORPORATION, San Jose, CA (US)

( * ) Notice: Subject to any disclaimer, the term of this patent is extended or adjusted under 35 U.S.C. 154(b) by 144 days.

(21) Appl. No.: 14/537,911

(22) Filed: Nov. 11, 2014

(65) Prior Publication Data
US 2016/0135127 A1 May 12, 2016

(51) Int. Cl.
*H04W 52/02* (2009.01)

(52) U.S. Cl.
CPC ....... *H04W 52/0264* (2013.01); *H04W 52/028* (2013.01); *H04W 52/0216* (2013.01); *H04W 52/0258* (2013.01)

(58) Field of Classification Search
CPC ........... H04W 52/0258–52/0264; Y02B 60/18
USPC ...... 370/311; 455/418, 550.1, 574; 709/203, 709/223, 224; 713/320, 323, 340
See application file for complete search history.

(56) References Cited

U.S. PATENT DOCUMENTS

| | | | |
|---|---|---|---|
| 7,430,400 B2 | 9/2008 | Russo et al. | |
| 8,190,200 B2 | 5/2012 | Conway et al. | |
| 8,364,080 B2 | 1/2013 | Desai et al. | |
| 8,565,112 B2 | 10/2013 | Peiris et al. | |
| 8,576,762 B2 | 11/2013 | Thomas et al. | |
| 2008/0095097 A1 | 4/2008 | Mehta et al. | |
| 2011/0153728 A1* | 6/2011 | Einarsson | H04W 52/0229 709/203 |
| 2012/0178496 A1* | 7/2012 | Hwang | H04W 52/0264 455/550.1 |
| 2014/0029535 A1 | 1/2014 | Medapalli | |
| 2014/0105084 A1* | 4/2014 | Chhabra | H04W 52/0209 370/311 |
| 2014/0221054 A1* | 8/2014 | Lin | H04W 52/0229 455/574 |

OTHER PUBLICATIONS

Shengbo Chen, Tarun Bansal, Yin Sun, Prasun Sinha, Ness B. Shroff, Life-Add: Lifetime Adjustable Design for WiFi Networks with Heterogeneous Energy Supplies, http://newslab.ece.ohio-state.edu/research/resources/scheduling.pdf, date 2013, pp. 508-515.

* cited by examiner

*Primary Examiner* — Charles C Jiang
*Assistant Examiner* — Wali Butt
(74) *Attorney, Agent, or Firm* — IPHORIZONS PLLC; Narendra Reddy Thappeta (57) ABSTRACT

A wireless station of a wireless network identifies required active durations based on outbound request packets. Each active duration is from around a first time instance at which a corresponding request packet is to be transmitted to a second time instance corresponding to receipt of the corresponding response packet. A receiver of the wireless station is placed in an active mode in the active durations. The wireless station transmits and receives packets in the active durations. The wireless station operates the receiver in power-down mode when the receiver is not required to be operated in the active mode.

21 Claims, 5 Drawing Sheets

REDUCING POWER CONSUMPTION IN WIRELESS STATIONS EXECUTING VARIOUS CLIENT APPLICATIONS

BACKGROUND

Technical Field

Embodiments of the present disclosure relate generally to wireless devices, and more specifically to reducing power consumption in wireless stations executing various client applications.

Related Art

A wireless station refers to an end station of a wireless network. In one common scenario, wireless stations rely on access points as switching devices for transporting packets from one wireless station to another wireless station. Thus, wireless stations are the end points of (potentially multi-hop) communication based on wireless medium.

Wireless stations can execute various client applications. A client application normally operates in request-response mode, implying that a packet containing a request is sent (by the client application) to a peer application (typically at a server), which then sends a response in the form of a corresponding packet.

There is a general need to reduce power consumption in wireless stations executing one or more client applications.

BRIEF DESCRIPTION OF THE VIEWS OF DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

A wireless station of a wireless network identifies required active durations based on outbound request packets. Each active duration is from around a first time instance at which a corresponding request packet is to be transmitted to a second time instance corresponding to receipt of the corresponding response packet. A receiver of the wireless station is placed in an active mode in the active durations. The wireless station transmits and receives packets in the active durations. The wireless station operates the receiver in power-down mode when the receiver is not required to be operated in the active mode.

In one embodiment, the first time instance and second time instance are express indications from user applications upon sending and receiving of request and response packets respectively. In an alternative embodiment, the first and second time instances are based on examination of headers of outbound and inbound packets.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

Figure 1:
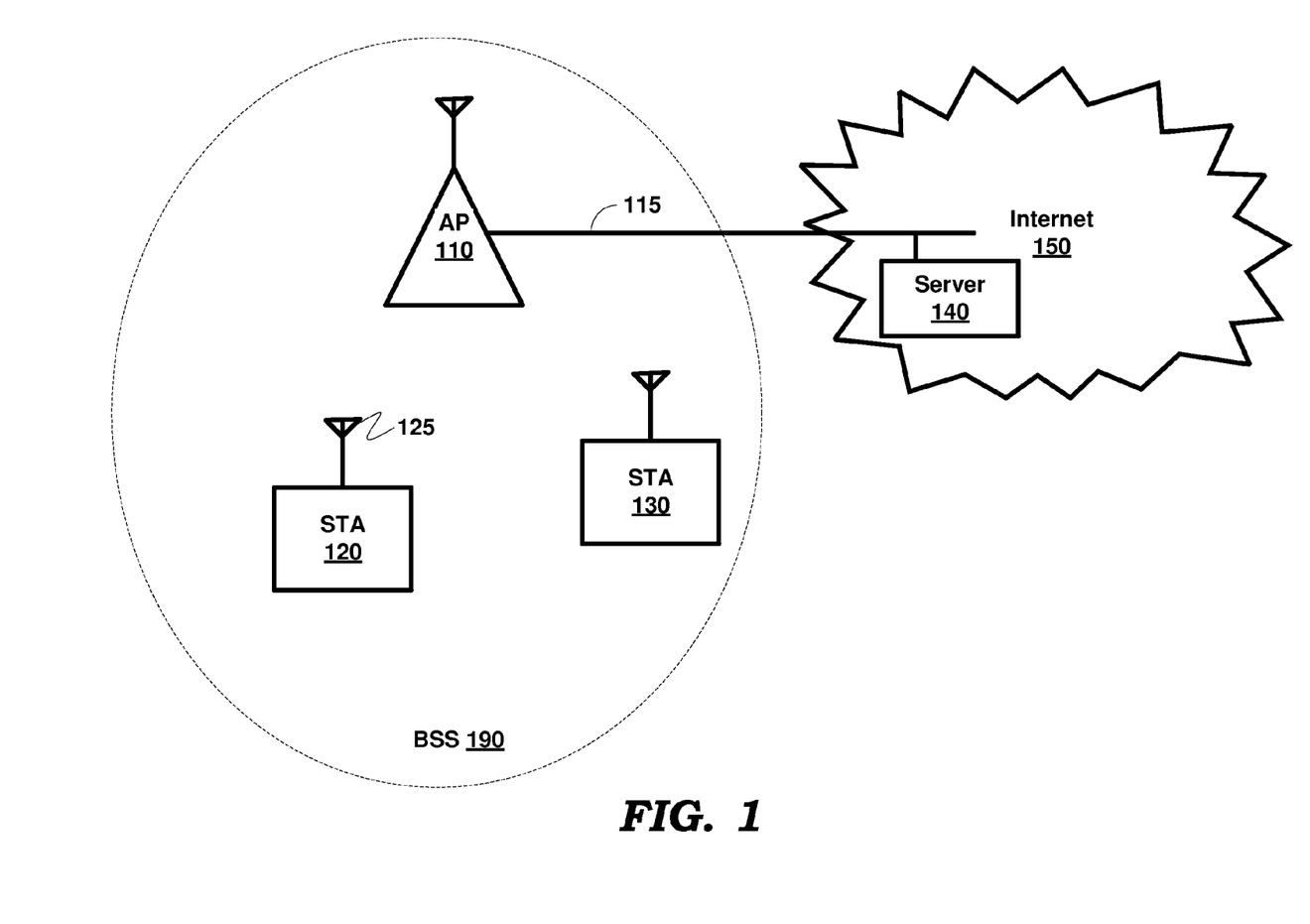
FIG. 1 is a block diagram of an example environment in which several aspects of the present disclosure may be implemented.

FIG. 1 is a block diagram representing an example environment in which several aspects of the present disclosure can be implemented. The example environment is shown containing only representative devices and systems for illustration. However, real world environments may contain more or fewer systems. FIG. 1 is shown containing access point (AP) 110, wireless stations (STA) 120 and 130, and internet 150. Server 140 is shown as being contained in internet 150. AP 110 and STAs 120 and 130 are generically referred to herein as wireless devices. STA 120 is shown containing antenna 125. AP 110 and STA 130 are also shown containing antennas, but not numbered.

Although, only two STAs are shown, the environment of FIG. 1 may contain more or less than two STAs also. Further, in the description below, the devices and the environment are described as operating consistent with Wireless Local Area Network (WLAN) according to IEEE 802.11 standard(s), merely for illustration. Implementations in other environments are also contemplated to be within the scope and spirit of various aspects of the present invention.

Internet 150 extends the connectivity of wireless devices 120 and 130 to various systems (e.g., server 140) connected to, or part of, internet 150. Internet 150 is shown connected to access point (AP) 110 through a wired path 115. STAs 120 and 130 may access devices/systems in internet 150 (including server 140) via AP 110. Internet 150 may be implemented using protocols such as IP. In general, in IP environments, an IP packet is used as a basic unit of transport, with the source address being set to the IP address assigned to the source system from which the packet originates and the destination address set to the IP address of the destination system to which the packet is to be eventually delivered. The IP packet is encapsulated in the payload of layer-2 packets when being transported across WLANs.

An IP packet is said to be directed to a destination system when the destination IP address of the packet is set to the IP address of the destination system, such that the packet is eventually delivered to the destination system. When the packet contains content such as port numbers, which specifies the destination application, the packet may be said to be directed to such application as well. The destination system may be required to keep the corresponding port numbers available/open, and process the packets with the corresponding destination ports.

Block 190, shown containing AP 110 and STAs 120 and 130, represents a basic service set (BSS) of an infrastructure mode wireless network consistent with the IEEE 802.11 standard. Although only a single BSS is shown and described, other environments may include more than one BSS, with the BSSs being interconnected to form an extended service set (ESS) consistent with IEEE 802.11 standards, as is well known.

AP 110 represents a switching device, and forwards data packets received from one STA to the other STA. AP 110 also forwards data packets received from any of the STAs and destined for a device(s) (including server 140) in internet 150. AP 110 may receive data packets from internet 150 (including from server 140) and forward the data packets to the corresponding destination STA(s). Further, AP 110 may perform various other operations consistent with IEEE 802.11 (WLAN) standards, as is well known in the relevant arts.

Server 140 represents a device/system that executes applications (peer applications) that communicate with corresponding client applications(s) executing in STA 120 and STA 130. Though shown connected by wired path in Internet 150, server 140 may be accessible by wireless paths as well.

Each of STAs 120 and 130 represent end devices of wireless network (BSS 190), and may be the source or destination (i.e., consumer) of data packets (data units). In particular, each STA may execute corresponding (client) applications that may communicate (via AP 110) with peer applications executing in an external device/system, such as, for example, server 140. As noted above, a client application may send request packets to a corresponding peer application (e.g., executing in server 140), which may then send corresponding response packets back to the client application.

It may be desirable to reduce power consumption in a wireless station. The reduction may be attained by placing in power-down mode, (at least a portion of) the wireless receiver based on various conditions in accordance with features of the present disclosure, as described below with examples.

3. Reducing Power Consumption

Figure 2:
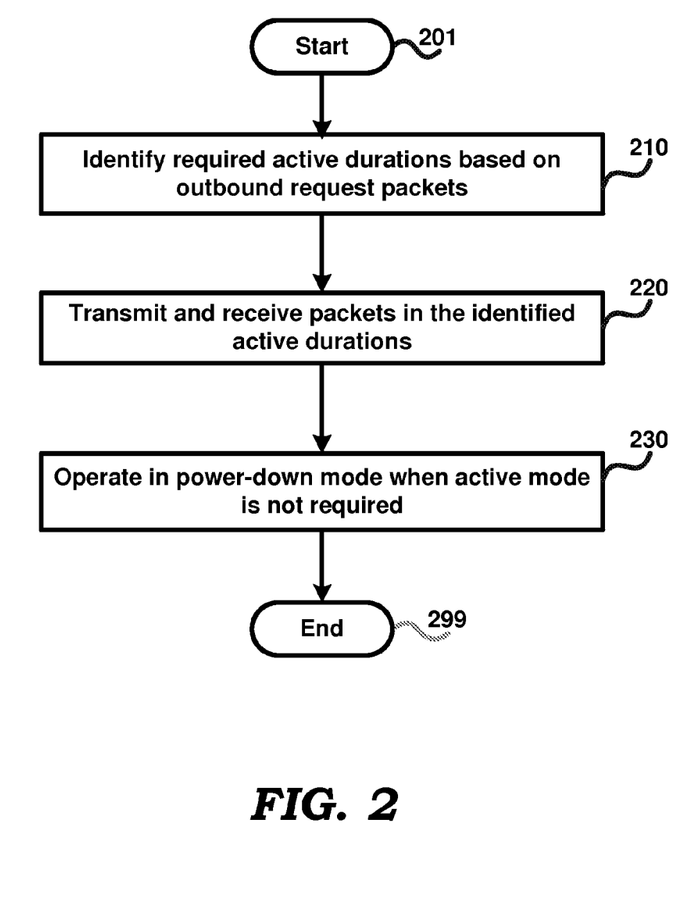
FIG. 2 is a flow chart illustrating the manner in which a wireless receiver of a wireless station is operated in an embodiment.

FIG. 2 is a flow chart illustrating the manner in which power consumption in a wireless station executing client applications is reduced, in an embodiment of the present disclosure. Merely for illustration, the flowchart is described below as being performed in STA 120. However, the features can be implemented in STA 130, as well as in other systems and environments without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, STA 120 identifies active durations based on outbound request packets. Active durations represent time durations during which STA 120 is to maintain its receiver in active (power-ON) mode. Active mode refers to an operating mode of the receiver, in which the required portions of the receiver (RF, baseband, etc.) are powered ON (with clock gating to baseband removed if earlier applied), to be able to receive and process WLAN signals, and extract data/information from the WLAN signals.

Outbound request packets are generated by corresponding applications executing in STA 120. The requests may be directed to a corresponding peer application, for example, executing in server 140. In an embodiment, each application executing in STA 120 generates an express indication indicating the (time instant) of generation of an outbound request packet. Each application also generates an express indication specifying the time instant at which a response packet (or the last one of multiple response packets) is either received or expected to be received. STA 120 determines the active durations based on the express indications.

In an alternative embodiment, STA 120 examines various portions of the outbound packets, such as headers (e.g., TCP header) in a request packet. From the details of the headers, STA 120 determines that a request to a peer application has been made, and that a response from the peer application is expected. For example, a HTTP request packet may be identified based on the destination TCP/UDP port set to a pre-specified value, and the response may thereafter be correlated with the request.

In general, as will be clear from the below description as well, each active duration is from around a first time instance at which a corresponding request packet is to be transmitted to a second time instance corresponding to receipt of the respective response packet. Control then passes to step 220.

In step 220, STA 120 transmits and receives packets in the identified active durations. STA 120 maintains its receiver (in addition to its transmitter) in the active mode during the identified active durations. Control passes to step 230.

In step 230, STA 120 operates in power-down mode when active mode is not required. In the power-down mode STA 120 places its receiver in power-down mode. As used herein, the term 'receiver' refers to those hardware portions of STA 120 (excluding antenna 595 of FIG. 5, described below) that are used to receive a WLAN signal and demodulate the WLAN signal to extract data/control information in the WLAN signal. Depending on the specific implementation, the receiver may include circuitry to perform down-conversion of a WLAN RF signal, analog-to-digital conversion, sampling, baseband processing, etc, as is well known in the relevant arts. When set to power-down mode, power to some or all of the circuitry (hardware portions) of the receiver is turned OFF. In some implementations of STA 120, some of the receiver's operations (e.g., some or all baseband operations) may be performed by a processing block. In such implementations, the corresponding portion of the processing block may also be powered down (the term 'receiver' additionally including such portions of the processing block), and/or the corresponding software instructions may not be executed. Control then passes to step 299, in which the flowchart ends.

The manner in which active durations are determined by STA 120 is described next with respect to an example.

4. Determining Active Durations

Figure 3:
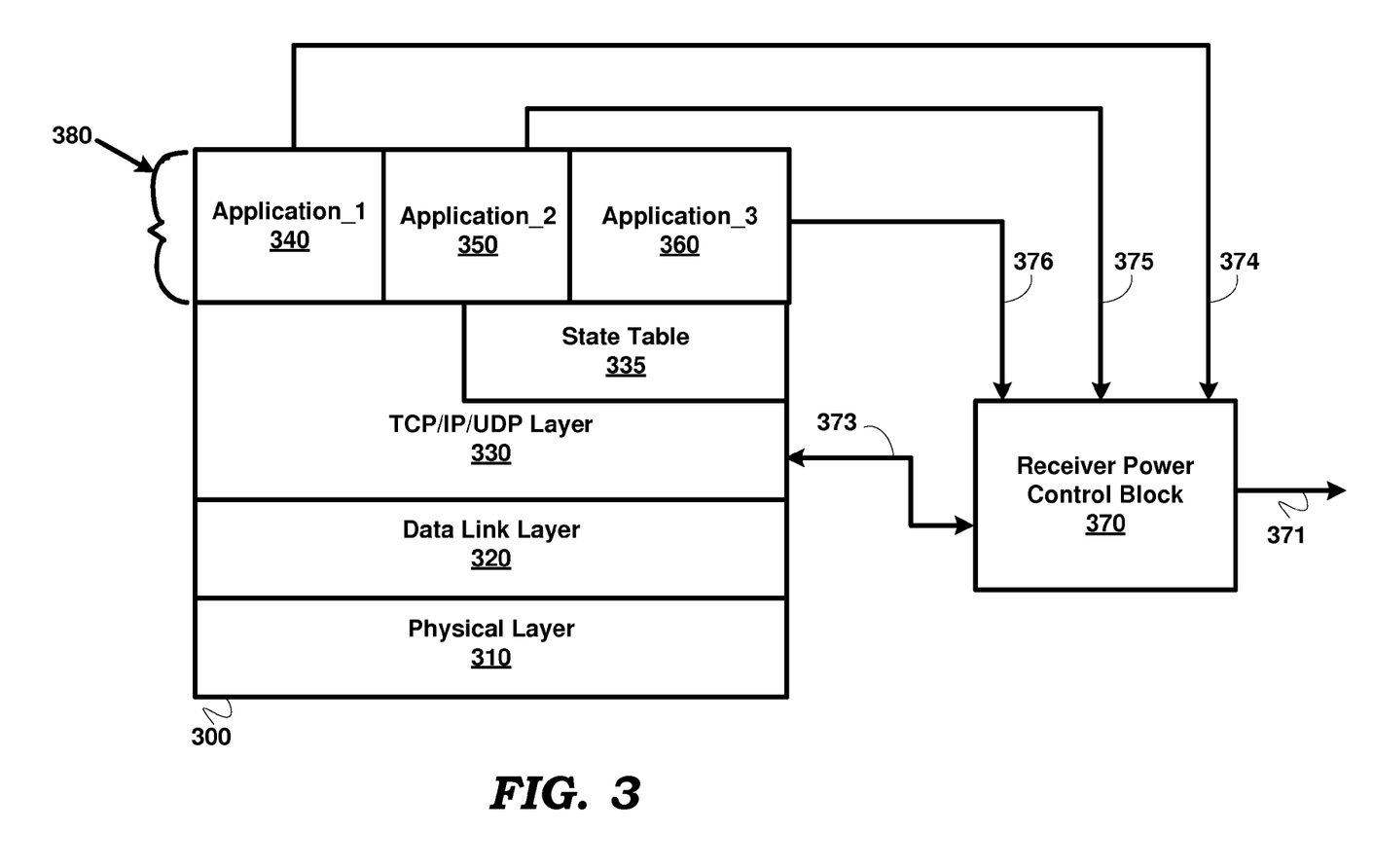
FIG. 3 is a diagram illustrating the interaction between corresponding protocol layers and a power control block in determining the operational state of a wireless receiver of a wireless station, in an embodiment.

FIG. 3 is a block diagram illustrating the manner in which active durations are determined by STA 120, in an embodiment. FIG. 3 is shown containing communication layer/protocol stack 300, receiver power control block 370, and corresponding interconnections.

Stack 300 is shown containing physical layer 310, data link layer 320, TCP/IP/UDP layer 330 and application layer 380. The communication layers are only briefly described below, since the corresponding implementations of the blocks would be well known to one skilled in the relevant arts on reading the disclosure herein.

Physical layer 310 represents the electrical and physical interface between STA 120 and a transmission medium (here a wireless medium). Physical layer 310 receives data from data link layer 320 and forwards the data to antenna 125 (FIG. 1) for transmission. Physical layer 310 receives data from antenna 125 and forwards the data to data link layer 320.

Data link layer 320, operates to provide a reliable data link between STA 120 and other nodes in a wireless network, and may perform medium access control (MAC) as well as error checking operations. Physical layer 310 and data link layer 320 may be designed to conform to the IEEE 802.11 family of specifications, and can be implemented in a known way in accordance with the description provided herein.

TCP/IP/UDP layer 330 performs operations for forming data packets (from data received from application layer 380) according to corresponding protocols such as Internet Protocol (IP) for transmission from STA 120 (via layers 320 and 310 and antenna 125) to an external device. TCP/IP/UDP layer 330 may store state information (e.g., port numbers) corresponding to each connection (i.e., between applications in STA 120 and a corresponding peer applications) in state table 335. TCP/IP/UDP layer 330 receives IP packets via layers 310 and 320, and antenna 125, identifies the specific application in application layer 380 that the packet is meant for (by inspecting the port numbers and other state information relating to the packet connection stored in state table 335), and forwards the data (payload) in the packet to the identified application.

Application layer 380 represents a communications component that allows software applications executing in STA 120 to communicate with software applications (peer applications) in other nodes (e.g., server 140) via the other blocks shown in FIG. 3. Application layer 380 is shown containing application_1 340, application_2 350 and application_3 360. Although three applications are shown as executing in STA 120, more or fewer than three applications can also be instead present.

In an embodiment of the present disclosure, the time interval from around the instant (i.e., starting at, slightly earlier than or later than the instant) when a request packet generated by an application is transmitted by STA 120 to the time instant around (i.e., ending at, or slightly later than the instant) when a corresponding response packet is either actually received by STA 120, or to the instant when the response packet is expected to be received at STA 120, is termed an active sub-duration. In situations in which multiple response packets are received in response to a single request packet, the corresponding active sub-duration is the time interval from around the instant (i.e., starting at, slightly earlier than or later than the instant) when a request packet generated by an application is transmitted by STA 120 to the time instant around (i.e., ending at, or slightly later than the instant) when the last of the multiple response packets is either actually received by or expected to be received at STA 120

When only one application is sending requests and receiving response(s), the active duration (of step 210) is the same as the active sub-duration corresponding to the application. However, when multiple applications send and receive corresponding single or multiple response packets, active duration is the logical OR of the active sub-durations of corresponding applications, as illustrated below with respect to FIG. 4.

In FIG. 3, each of applications 340, 350 and 360 expressly indicates via signals/messages on respective paths 374, 375 and 376, corresponding active sub-durations to receiver power control block 370. Applications 340, 350 and 360 may be suitably implemented or modified to enable such signaling/messaging. Start instant of an active sub-duration may be indicated by an application by sending a first signal/message (e.g., on path 374 in case of application 340) when a request packet is transmitted by the application to layer 330 of protocol stack 300, while end instant of the active sub-duration may be indicated by the application by sending a second signal/message (e.g., on path 374 in case of application 340) when a corresponding response packet is received by the application from layer 330 of protocol stack 300.

Receiver power control block 370 receives the express indications on paths 374, 375 and 376, and determines the active duration for which the receiver of STA 120 is to be placed in active mode. In the case of multiple applications sending request packets and receiving corresponding response packets, receiver power control block 370 may logically OR the respective active sub-durations to obtain the (effective) active duration, as noted above. Receiver power control block 370 may be implemented in the form of a set of corresponding software instructions or hardware or a combination of both software and hardware. Receiver power control block 370 provides an indication of whether the receiver of STA 120 is to be placed in active or power-down mode on path 371, which may be a physical or logical path depending on the implementation of receiver power control block 370.

According to another aspect, receiver power control block 370 examines, via path 373, headers (e.g., TCP headers) of packets handled by TCP/IP/UDP layer 330 to identify a request packet and the corresponding response packet, and thus the corresponding active duration. In the case of a single request packet and only one (single) corresponding response, receiver power control block 370 correlates the transmitted packet's source port number with the response packet's destination port number, and thus identifies that the response packet is related to (is the response to) the corresponding request packet. State table 335 may be extended to indicate the connection on which responses are pending for corresponding requests, for the purpose of determining active durations. Only when no pending responses are present (or upon expiry of some timer from the start of active duration), the active duration may be ended.

In more complex situations, such as one request and multiple corresponding responses, or requests from multiple applications and corresponding multiple responses) corresponding techniques may be employed to identify the active durations. The description is continued with the illustration of a timing diagram showing the manner in which active durations of the receiver of STA 120 is determined based on client applications, in an embodiment.

5. Timing Diagram

Figure 4:
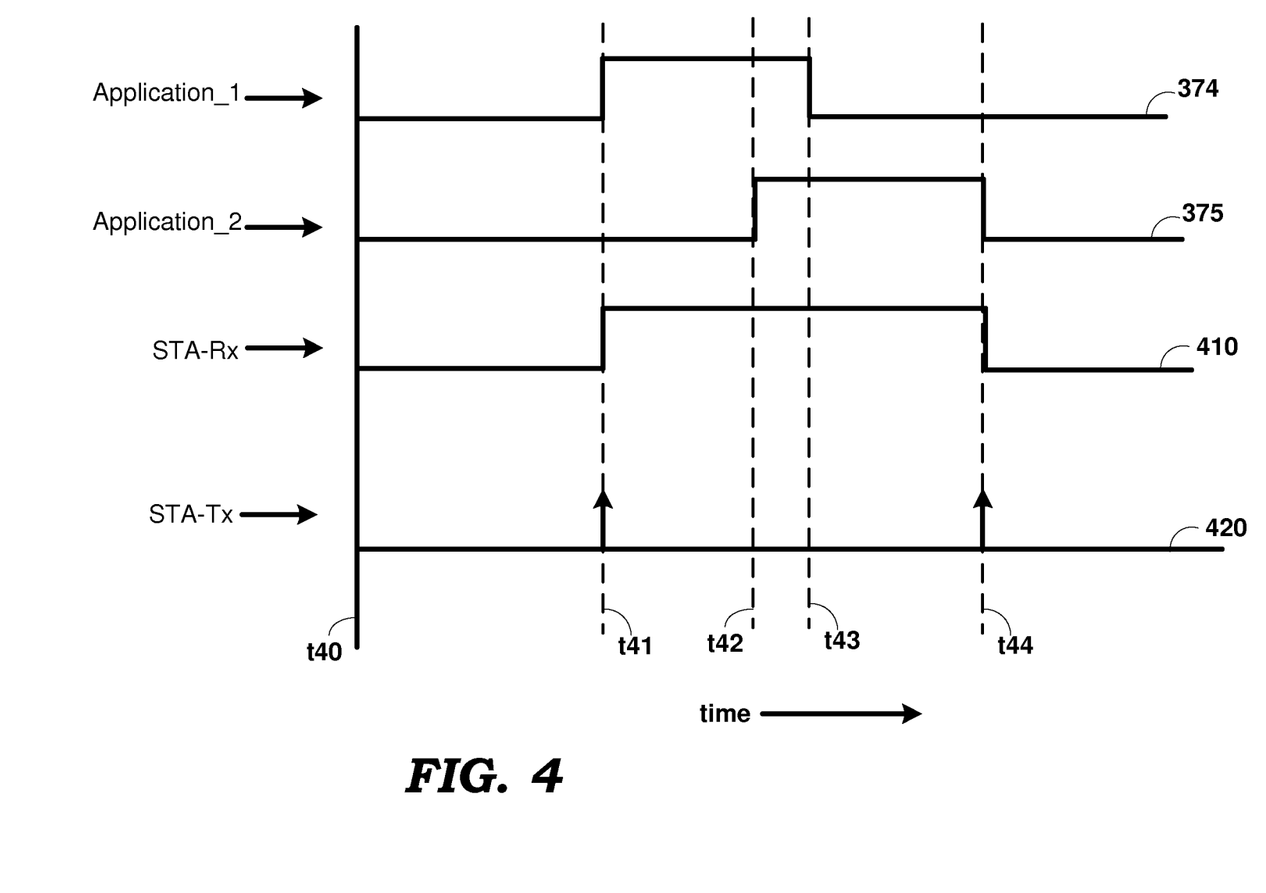
FIG. 4 is a timing diagram illustrating the modes of operation of a wireless station based on client applications, in an embodiment.

FIG. 4 is an example timing diagram illustrating the manner in which the operational state of a receiver of STA 120 is controlled, in an embodiment. It is assumed in example of FIG. 4 that only applications 340 and 350 are currently executing (application 360 is not executing), and that receiver power control block 370 does not monitor state table 335 or inspect packet headers, but relies only on signals/messages 374 and 375 to make its decision on which mode, active or power-down, to place the receiver of STA 120 in. However, it may be appreciated that receiver power control block 370 can instead monitor state table 335 to determine the active and power-saving durations.

With respect to FIG. 4, transmissions and reception from AP 110 are assumed to occur at the corresponding instances/ intervals, but not shown in the interest of clarity. Further, it is assumed in the following description that STA 120 has associated and authenticated with AP 110 sometime prior to time instance t40. Also, it is assumed that STA 120 has synchronized its local clock (maintained in RTC 540) with a master clock maintained in AP 110. Further still, it is assumed that STA 120 has negotiated a listen interval in cooperation with AP 110, also prior to t40. The listen interval represents the maximum duration for which AP 110 can locally (within AP 110) buffer unicast data destined for STA 120. However, such listen intervals may be ignored by STA 120, since the active and inactive time durations of receiver of STA 120 are based on client applications, as noted above.

Application_1 340 is assumed to transmit a request packet at time instance t41, and receive a corresponding response packet at t43, and thus the active sub-duration requested by application_1 340 is represented by the logic high duration in interval t41-t43 of waveform 374.

Application_2 350 is assumed to transmit a request packet at time instance t42, and receive a corresponding response packet at t44, and thus the active sub-duration requested by application_2 350 is represented by the logic high duration in interval t42-t44 of waveform 375.

The operational state of the receiver of STA 120 is represented by waveform 410 (STA-Rx), in which logic high portion of waveform 410 represents the active mode (effective active duration), and logic low portions of waveform 410 represents power-down mode. At time instance t41, STA 120 switches on its receiver, and maintains its receiver in the active mode until t44. At t44, STA 120 places its receiver in power-down mode.

Each of the active high durations of signals/messages 374 and 375 are active sub-durations corresponding respectively to applications 340 and 350. It may be observed from FIG. 4 that the effective active duration (t41-t44) is the logical OR of the two active sub-durations t41-t43 (corresponding to application 340) and t42-t44 (corresponding to application 350). In other words, the active duration begins at the earlier of the two transmissions (t41 and t42), and ends at the later of the two receipts (t43 and t44).

It is noted here that assuming application_3 360 also were to be active and sends a request packet, there would another active sub-duration corresponding to application_3 360 as well, and the effective active duration would be the logical OR of the three active sub-durations.

Waveform 420 (STA-Tx) represents transmissions (indicated by vertical arrows) from the transmitter of STA 120. At t41, STA 120 transmits a NULL frame to AP 110, with the power management (PM) bit in the NULL frame indicating that the receiver of STA 120 is transitioning to active mode. In response to receipt of the NULL frame at t41, AP 110 may stop buffering data destined for STA 120. At t44, STA 120 transmits a NULL frame to AP 110, with the power management (PM) bit in the NULL frame indicating that the receiver of STA 120 is transitioning to power-down mode. In response to receipt of the NULL frame at t44, AP 110 may commence buffering data destined for STA 120.

While in the example of FIG. 4 an active sub-duration (corresponding to an application) is noted above as being the interval from transmission instant of request packet to receive instant of a corresponding response packet, in an another embodiment the transmission instant of a request packet still represents the start of the active sub-duration, but the end of the active sub-duration is determined/estimated adaptively.

For example, once a request packet is transmitted, the active sub-duration starts, and lasts until a corresponding response packet is 'expected' to be received. The expected arrival instant of a response packet may be estimated by one of several well known techniques. Assuming the interval from the instant of transmission of the request packet to the expected arrival instant of the response packet is T for a first transmitted packet of an application, receiver power control block 370 may initially set the active sub-duration to T. However, if the actual receipt of the response packet occurs earlier than expiry of interval T, then receiver power control block 370 reduces the active sub-duration to (T−X) for the next packet of the same application, with (T−X) representing the actual interval from transmission of request to receipt of response.

On the other hand, if the response to the first packet is not received by interval T (the response would be missed in this case), STA 120 may request for retransmission of the response to the first packet, and increase the active sub-duration for the next packet to (T+X), which represents the actual round trip from request to response. Thus, each active sub-duration may be dynamically adjusted, and the actual sub-duration adaptively learnt by receiver power control block 370. The effective active duration still continues to be logical OR of the respective active sub-durations.

In another embodiment, the active sub-durations corresponding to each of a first sequence of N packets (N being an integer) of an application is set to be time interval T. The active sub-durations corresponding to each of a next sequence of N packets may be set to (T+X) or (T−X), based on actual (or average) time from a request to response in the first sequence. Active sub-durations of the next set of N packets may be further changed based on actual (or average) time from a request to response in the second sequence, and so on.

Further still, the magnitude of X (noted above) may be different depending on which peer application the application on STA 120 is communicating with. For example, if application_1 340 is concurrently communicating with two peer applications in server 140, receiver power control block 370 may employ one set of values of N and X corresponding to one peer application, while employing a second set of values of N and X corresponding to the second peer application.

The implementation details of a wireless station in an embodiment of the present disclosure are provided next.

6. Example Implementation

Figure 5:
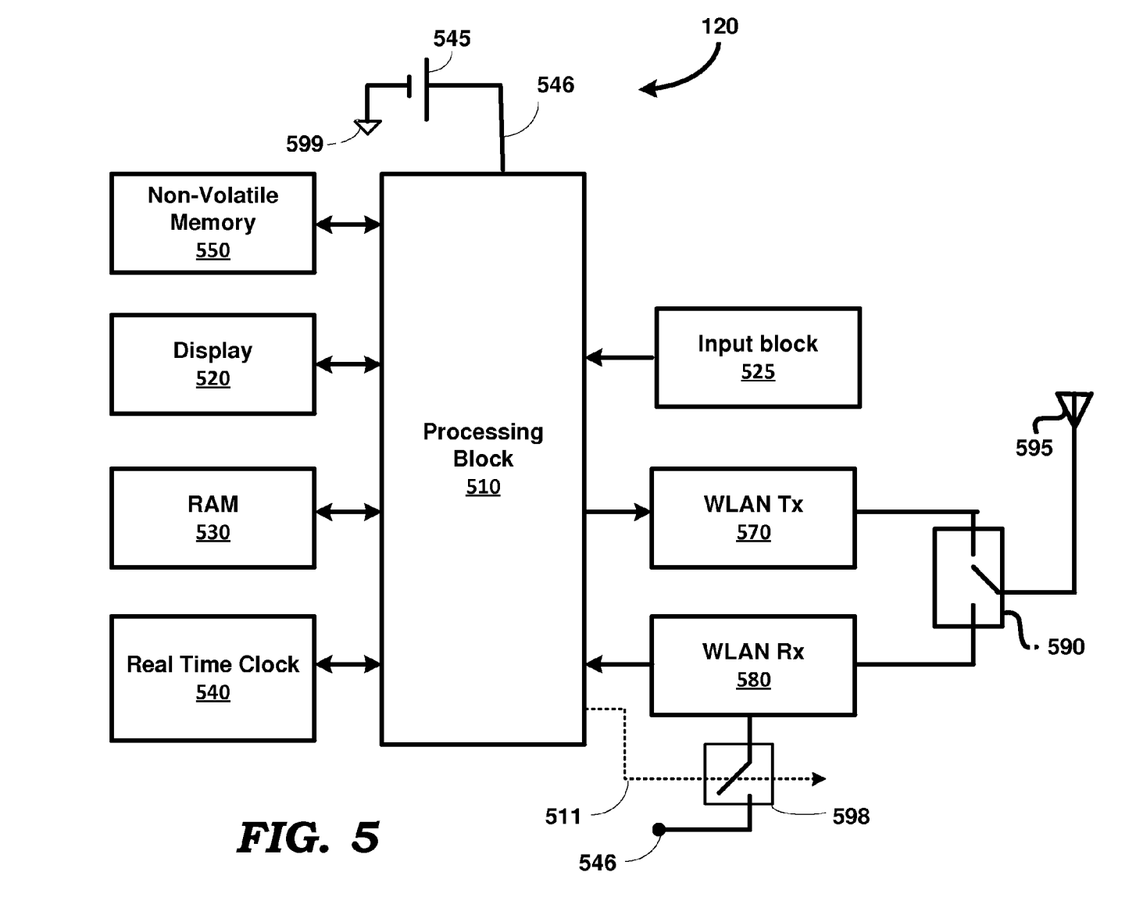
FIG. 5 is a block diagram illustrating the implementation details of a wireless station in an embodiment.

FIG. 5 is a block diagram showing the implementation details of a wireless station in an embodiment of the present disclosure. STA 120 is shown containing processing block 510, display 520, random access memory (RAM) 530, real-time clock (RTC) 540, battery 545, non-volatile memory 550, WLAN transmitter (Tx) 570, WLAN receiver (Rx) 580, switches 590 and 598, and antenna 595. The whole of STA 120 may be implemented as a system-on-chip (SoC), except for battery 545 and antenna 595. Alternatively, the blocks of FIG. 5 may be implemented on separate integrated circuits (IC). Terminal 599 represents a ground terminal, and path 546 represents a power terminal. Receiver power control block 370 of FIG. 3 is assumed implemented as software modules (executed by processing block 510), and hence not shown in FIG. 5.

Battery 545 provides power for operation of STA 120, and may be connected to the various blocks shown in FIG. 5, although only the connection to WLAN Rx 580 via power switch 598 is shown. RTC 540 operates as a clock, and provides the 'current' time to processing block 510. STA 120 may communicate with a central server (in internet 150) that maintains accurate time, to correct/update the time maintained locally in RTC 540.

Antenna 595 (which corresponds to antenna 125 of FIG. 1) operates to receive from, and transmit to, a wireless medium, corresponding wireless signals according to IEEE 802.11 (WLAN) standards. Switch 590 may be controlled by processing block 510 (connection not shown) to connect antenna 595 to one of blocks 570 and 580 as desired, depending on whether transmission or reception of WLAN (IEEE 802.11) signals is required. Switch 590, antenna 595 and the corresponding connections of FIG. 5 are shown merely by way of illustration. Instead of a single antenna 595, separate antennas, one for transmission and another for reception of WLAN signals, can also be used. Various other techniques, well known in the relevant arts, can also be used instead.

Input block 525 enables a user to provide inputs to STA 120, and may correspond to a keypad. Display 520 provides visual display to a user of various outputs (e.g., of client applications) from STA 120.

WLAN Tx 570 receives data to be transmitted according to WLAN standards from processing block 510, generates a modulated radio frequency (RF) signal according to IEEE 802.11 standards, and transmits the RF signal via switch 590 and antenna 595. WLAN Tx 570 may contain RF and baseband circuitry for generating and transmitting WLAN signals, as well as for medium access operations. Alternatively, WLAN Tx 570 may contain only the RF circuitry, with processing block 510 performing the baseband and medium access operations (in conjunction with the RF circuitry). Although not indicated in FIG. 5, processing block 510 may selectively power ON and power OFF of WLAN Tx 570 via a corresponding power switch (not shown, but similar to power switch 598), to reduce power whenever there are no WLAN signals to be transmitted.

WLAN Rx 580 represents a receiver that receives an RF signal (according to IEEE 802.11/WLAN standards) bearing data and/or control information via switch 590, and antenna 595, demodulates the RF signal, and provides the extracted data or control information to processing block 510. WLAN Rx 580 may be implemented according to one of several well known approaches. Thus, for example, WLAN Rx 580 may contain RF as well as baseband processing circuitry for processing a WLAN signal. Alternatively, WLAN Rx 580 may contain only the RF circuitry, with processing block 510 performing the baseband operations in conjunction with the RF circuitry. WLAN Rx 580 may selectively be powered OFF and powered ON by controlling (by processing block 510, for example) corresponding circuitry, such as power switches (not shown), connecting WLAN Rx 580 to battery 545. Further, when WLAN Rx 580 includes baseband processing circuitry, such circuitry may also be selectively powered OFF and powered ON. Alternatively, the master clock provided for operation of such baseband circuitry may be capable of being gated OFF and gated ON by corresponding circuitry.

Non-volatile memory 550 is a non-transitory machine readable medium, and stores instructions, which when executed by processing block 510, causes STA 120 to operate as described above. In particular, the instructions enable STA 120 to operate as described with respect to the flowchart of FIG. 2, when implemented correspondingly. Non-volatile memory 550 also stores instructions representing applications 340, 350 and 360, as well as receiver power control block 370 (when implemented as software modules), and the software blocks of communication layers 300). RAM 530 is a volatile random access memory, and may be used for storing instructions and data.

Processing block 510 (or processor in general) may contain multiple processing units internally, with each processing unit potentially being designed for a specific task. Alternatively, processing block 510 may contain only a single general-purpose processing unit. Processing block 510 may execute instructions stored in non-volatile memory 550 or RAM 530 to enable device 120 to operate according to several aspects of the present disclosure, described above in detail.

Processing block 510 receives signal/message 371 from receiver power control block 370, and issues control signal 511 to selectively power-ON/power-OFF WLAN Rx 580 by closing or opening power switch 598. In some implementations of STA 120, processing block 510 may perform some operations (e.g., some or all baseband operations) related to receipt and demodulation of WLAN signals, as well as other operations such as decryption, error corrections, etc. In such implementations, the corresponding portion(s) of processing block 510 may be powered down, and/or the corresponding software instructions may not be executed in the power-down mode. In such implementations, the term 'receiver' as used herein refers to the combination WLAN Rx 580 and the corresponding portion(s) of processing block 510. When the receiver is in power-down mode, discharge of battery 545 may be reduced, thereby reducing power consumption. Processing block 510 may also selectively power-ON/power OFF WLAN Tx 570 based, for example, on whether STA 120 is (currently) to transmit wireless signals or not.

RAM 530 and non-volatile memory 550 (which may be implemented in the form of read-only memory/ROM/Flash) constitute computer program products or machine (or computer) readable medium, which are means for providing instructions to processing block 510. Thus, such medium can be in the form of removable (floppy, CDs, tape, etc.) or non-removable (hard drive, etc.) medium. Processing block 510 may retrieve the instructions, and execute the instructions to provide several features of the present disclosure.

7. Conclusion

References throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method performed in a wireless station of a wireless network, said method comprising:
    receiving outbound request packets from one or more applications executing in said wireless station, each outbound request packet being for transmission by said wireless station on said wireless network as a corresponding packet;

identifying required active durations based on said outbound request packets;

transmitting and receiving packets in said active durations on said wireless network, wherein a receiver of said wireless station is placed in an active mode in said active durations, wherein the transmitted packets comprise the corresponding packets representing said outbound request packets, wherein an active duration of said active durations is between a first time instance and a second time instance, wherein said identifying comprises examining request packets formed by said one more applications executing in said wireless network, wherein said first time instance corresponds to a time instance at which a corresponding request packet is to be transmitted on said wireless network, wherein said second time instance corresponds to a time instance of receipt of the corresponding response packet from said wireless network; and operating said receiver in power-down mode when said receiver is not required to be operated in said active mode, wherein power is turned off to at least a portion of said receiver when operating said receiver in power-down mode and power is provided to said portion in said active mode, wherein said wireless station is unable to receive packets in said power-down mode due to power being turned off to said portion of said receiver.

2. The method of claim 1, wherein said examining examines the transport header of each packet transmitted and received by said wireless station to determine the pair of packets constituting a request packet and corresponding response packet.

3. The method of claim 1, wherein said required active durations are in relation to a first client application executing in said wireless station, said required active durations including a first active duration, wherein a second active duration is identified in relation to a second client application also executing in said wireless station, wherein the first active duration overlaps with said second active duration, wherein said receiver is placed in said active mode at a start instance corresponding to the earlier one of the start instances of said first active duration and said second active duration, wherein said receiver is placed in said power-down only at or after the later one of the end instances of said first active duration and said second active duration.

4. The method of claim 1, wherein said wireless station is designed in accordance with IEEE 802.11 standards.

5. A wireless station of a wireless network, said wireless station comprising:

a receiver; and a processor executing one or more application and operable to perform the actions of:

receiving outbound request packets from said one or more applications executing in said wireless station, each outbound request packet being for transmission by said wireless station on said wireless network as a corresponding packet;

identifying required active durations based on said outbound request packets;

transmitting and receiving packets in said active durations, wherein said receiver is placed in an active mode in said active durations, wherein the transmitted packets comprise the corresponding packets representing said outbound request packets, wherein an active duration of said active durations is between a first time instance and a second time instance, wherein said processor is operable to examine request packets formed by said one more applications executing in said wireless network, wherein said first time instance corresponds to a time instance at which a corresponding request packet is to be transmitted on said wireless network, wherein said second time instance corresponds to a time instance of receipt of the corresponding response packet from said wireless network; and operating said receiver in power-down mode when said receiver is not required to be operated in said active mode, wherein power is turned off to at least a portion of said receiver when operating said receiver in power-down mode and power is provided to said portion in said active mode, wherein said wireless station is unable to receive packets in said power-down mode due to power being turned off to said portion of said receiver.

6. The wireless station of claim 5, wherein said processor examines the transport header of each packet transmitted and received by said wireless station to determine the pair of packets constituting a request packet and corresponding response packet.

7. A non-transitory machine readable medium storing one or more sequences of instructions for operating a wireless station of a wireless network, wherein execution of said one or more instructions by one or more processors contained in said wireless station enables said wireless station to perform the actions of:

receiving outbound request packets from one or more applications executing in said wireless station, each outbound request packet being for transmission by said wireless station on said wireless network as a corresponding packet;

identifying required active durations based on said outbound request packets; transmitting and receiving packets in said active durations on said wireless network, wherein a receiver of said wireless station is placed in an active mode in said active durations wherein the transmitted packets comprise the corresponding packets representing said outbound request packets, wherein an active duration of said active durations is between a first time instance and a second time instance, wherein said processor is operable to examine request packets formed by said one more applications executing in said wireless network, wherein said first time instance corresponds to a time instance at which a corresponding request packet is to be transmitted on said wireless network, wherein said second time instance corresponds to a time instance of receipt of the corresponding response packet from said wireless network; and operating said receiver in power-down mode when said receiver is not required to be operated in said active mode, wherein power is turned off to at least a portion of said receiver when operating said receiver in power-down mode and power is provided to said portion in said active mode, wherein said wireless station is unable to receive packets in said power-down mode due to power being turned off to said portion of said receiver.

8. The non-transitory machine readable medium of claim 7, wherein said required active durations are in relation to a first client application executing in said wireless station, said required active durations including a first active duration,
wherein a second active duration is identified in relation to a second client application also executing in said wireless station, wherein the first active duration overlaps with said second active duration,
wherein said receiver is placed in said active mode at a start instance corresponding to the earlier one of the start instances of said first active duration and said second active duration, wherein said receiver is placed in said power-down only at or after the later one of the end instances of said first active duration and said second active duration.

9. The non-transitory machine readable medium of claim 7, wherein said wireless station is designed in accordance with IEEE 802.11 standards.

10. A method performed in a wireless station of a wireless network, said method comprising:
receiving outbound request packets from one or more applications executing in said wireless station, each outbound request packet being for transmission by said wireless station on said wireless network as a corresponding packet;
identifying required active durations based on said outbound request packets;
transmitting and receiving packets in said active durations on said wireless network, wherein a receiver of said wireless station is placed in an active mode in said active durations, wherein the transmitted packets comprise the corresponding packets representing said outbound request packets;
receiving a first express indication that a first request packet is being transmitted and a second express indication that a first response packet corresponding to said first request packet has been received, wherein said identifying identifies a corresponding active duration as being between said first express indication and said second express indication; and
operating said receiver in power-down mode when said receiver is not required to be operated in said active mode, wherein power is turned off to at least a portion of said receiver when operating said receiver in power-down mode and power is provided to said portion in said active mode, wherein said wireless station is unable to receive packets in said power-down mode due to power being turned off to said portion of said receiver.

11. The method of claim 10, wherein said second express indication corresponds to actual receipt of said corresponding response packet.

12. The method of claim 10, wherein said second express indication corresponds instead to an expected time instance at which the corresponding response packet is expected to be received.

13. The method of claim 10, wherein said expected time instance for said response packets is adaptively learnt by examining the duration for receiving each response after sending of the corresponding request.

14. The method of claim 10, wherein said second express indication indicates instead that a last one of a plurality of response packets has been received, said plurality of response packets corresponding to said corresponding request packet.

15. The method of claim 10, wherein said required active durations are in relation to a first client application executing in said wireless station, said required active durations including a first active duration,
wherein a second active duration is identified in relation to a second client application also executing in said wireless station, wherein the first active duration overlaps with said second active duration,
wherein said receiver is placed in said active mode at a start instance corresponding to the earlier one of the start instances of said first active duration and said second active duration, wherein said receiver is placed in said power-down only at or after the later one of the end instances of said first active duration and said second active duration.

16. A wireless station of a wireless network, said wireless station comprising:
a receiver; and
a processor executing one or more application and operable to perform the actions of:
receiving outbound request packets from said one or more applications executing in said wireless station, each outbound request packet being for transmission by said wireless station on said wireless network as a corresponding packet;
identifying required active durations based on said outbound request packets;
transmitting and receiving packets in said active durations, wherein said receiver is placed in an active mode in said active durations, wherein the transmitted packets comprise the corresponding packets representing said outbound request packets;
receive a first express indication that a first request packet is being transmitted and a second express indication that a first response packet corresponding to said first request packet has been received, wherein said processor identifies a corresponding active duration as being between said first express indication and said second express indication; and
operating said receiver in power-down mode when said receiver is not required to be operated in said active mode, wherein power is turned off to at least a portion of said receiver when operating said receiver in power-down mode and power is provided to said portion in said active mode, wherein said wireless station is unable to receive packets in said power-down mode due to power being turned off to said portion of said receiver.

17. The method of claim 16, wherein said second express indication corresponds to actual receipt of said corresponding response packet.

18. The method of claim 16, wherein said second express indication corresponds instead to an expected time instance at which the corresponding response packet is expected to be received.

19. The method of claim 16, wherein said required active durations are in relation to a first client application executing in said wireless station, said required active durations including a first active duration,
wherein a second active duration is identified in relation to a second client application also executing in said wireless station, wherein the first active duration overlaps with said second active duration,
wherein said receiver is placed in said active mode at a start instance corresponding to the earlier one of the start instances of said first active duration and said second active duration, wherein said receiver is placed in said power-down only at or after the later one of the end instances of said first active duration and said second active duration.

20. A non-transitory machine readable medium storing one or more sequences of instructions for operating a wireless station of a wireless network, wherein execution of said one or more instructions by one or more processors contained in said wireless station enables said wireless station to perform the actions of:

receiving outbound request packets from one or more applications executing in said wireless station, each outbound request packet being for transmission by said wireless station on said wireless network as a corresponding packet;

identifying required active durations based on said outbound request packets;

transmitting and receiving packets in said active durations on said wireless network, wherein a receiver of said wireless station is placed in an active mode in said active durations wherein the transmitted packets comprise the corresponding packets representing said outbound request packets;

receiving a first express indication that a first request packet is being transmitted and a second express indication that a first response packet corresponding to said first request packet has been received, wherein said identifying identifies a corresponding active duration as being between said first express indication and said second express indication; and operating said receiver in power-down mode when said receiver is not required to be operated in said active mode, wherein power is turned off to at least a portion of said receiver when operating said receiver in power-down mode and power is provided to said portion in said active mode, wherein said wireless station is unable to receive packets in said power-down mode due to power being turned off to said portion of said receiver.

21. The non-transitory machine readable medium of claim 20, wherein said required active durations are in relation to a first client application executing in said wireless station, said required active durations including a first active duration, wherein a second active duration is identified in relation to a second client application also executing in said wireless station, wherein the first active duration overlaps with said second active duration, wherein said receiver is placed in said active mode at a start instance corresponding to the earlier one of the start instances of said first active duration and said second active duration, wherein said receiver is placed in said power-down only at or after the later one of the end instances of said first active duration and said second active duration.

* * * * *